United States Patent [19]

Nadeau et al.

[11] Patent Number: 5,345,982
[45] Date of Patent: Sep. 13, 1994

[54] ADJUSTABLE HOOD ASSEMBLY

[75] Inventors: Ronald P. Nadeau, Syracuse; Frank V. Smith, Jr., Town of Skaneateles, both of N.Y.

[73] Assignee: Griffin Environmental Co., Inc., Syracuse, N.Y.

[21] Appl. No.: 978,395

[22] Filed: Nov. 18, 1992

[51] Int. Cl.⁵ .............................................. E04H 15/14
[52] U.S. Cl. ........................................ 141/93; 141/59; 454/67
[58] Field of Search ............... 141/59, 65, 93; 454/49, 454/63, 65, 67

[56] References Cited

U.S. PATENT DOCUMENTS

| | | | |
|---|---|---|---|
| 3,707,998 | 1/1973 | Dalrymple | 141/93 |
| 4,420,285 | 12/1983 | Loyer et al. | 141/93 X |
| 4,579,154 | 4/1986 | Müller | 141/93 X |

Primary Examiner—Harold Joyce
Attorney, Agent, or Firm—Harris Beach & Wilcox

[57] ABSTRACT

A drive-through adjustable hood assembly for enclosing a transit mix cement truck during the filling of dry material so as to contain and capture dust and particulate matter. The adjustable hood assembly is mounted on an expanding and retracting frame system. Entrance and exhaust ports are provided in the hood so that a truck can be filled and the resulting dust removed to prevent contamination of the atmosphere. A clam shell type enclosure is thus provided which in the extended open position allows unobstructed access into the adjustable hood assembly and in the retracted closed position provides intimate wrap-around enclosure of the cement truck during filling and dust removal operations. The width of the assembly in the extended open position can be varied by making minor mechanical adjustments to the frame system.

11 Claims, 5 Drawing Sheets

ADJUSTABLE HOOD ASSEMBLY

BACKGROUND OF THE INVENTION

This invention relates to an environmental hood assembly for capturing contaminating fumes, dust and the like, and more particularly to an adjustable hood assembly for capturing and collecting dust and other particulate material released during the filling of a container with dry material such as cement, aggregate, or similiar materials.

In the typical batch cement plant for producing cement for construction and other purposes, individual transit mix trucks are generally filled with a dry mix of cement and other appropriate aggregate materials from a batch plant through a hopper or series of hoppers which introduce the material into the truck mixer drum through a chute directed into the mouth of the mixer drum. Water for completing the mix is generally stored in a tank on the truck and introduced during the mixing operation after the dry materials have been deposited into the mixer drum. Even when the dry materials are introduced simultaneously with water, there is still a significant amount of airborne dust and particulate matter created in this filling operation. As environmental regulations concerning air pollution and the like have become increasingly restrictive, cement plants must be able to prevent the release of dust and other particulate matter into the surrounding atmosphere during truck filling operations. Since cement mixer trucks come in all sizes and shapes, with filling being accomplished anywhere from the front to the back of the truck depending on make and model, the problem of capturing dust and other dry particulate material has become more and more difficult.

In our U.S. Pat. No. 5,191,909 of Mar. 9, 1993, we have shown a particular hood for enclosing the filling end of the truck when the dry particulate material is being fed into the truck from the hoppers of a batch cement plant. In the aforesaid patent, we have disclosed a hood and flexible skirt arrangement for enclosing the end of the truck during the filling operation with an attached exhaust system for capturing the dust generated from within the enclosure and returning it to the appropriate hopper. The hood disclosed therein includes a pair of side curtains that can be opened to an extended position to allow entrance of a truck and enclosed about the truck to closely drape about and enclose the filling chute area of the truck so as to capture substantially all the dust created by the filling operation. This extendable clam shell type of enclosure has proved to be an improvement allowing easier alignment of the mixer truck with the filling chute while still substantially enclosing the truck during filling operation so as to capture and remove the environmentally damaging dust and particulate material.

While this disclosed construction has proven to be an improvement over prior art devices, the swinging door end enclosure panels have been found in some situations to present a problem for truck drivers. The hood assembly of the present invention improves upon the device disclosed in the above-referenced U.S. patent by providing the hood assembly with end panels that automatically open and close when the side panels are, respectively, extended and retracted.

The hood assembly is further improved by the present invention by providing adjustable features that allow proper operation at installation sites having space limitations.

OBJECTS AND SUMMARY OF THE INVENTION

It is therefore an object of the present invention to provide an adjustable hood assembly for transit mix trucks that overcomes the limitations of prior art devices.

It is another object of the present invention to provide an adjustable hood assembly for transit mix trucks that provides greater access for drive-through operation.

It is another object of the present invention to provide a clam shell type adjustable hood assembly for transit mix trucks in which the rear closure panels are aligned with the side panels when the hood assembly is in the extended open position.

Yet another object of the present invention is to provide an adjustable hood assembly for transit mix trucks in which the width of the assembly in the extended open position can be varied thereby allowing proper functioning of the assembly in a variety of confined spaces.

It is a further object of the present invention to provide an adjustable hood assembly for transit mix trucks in which the frame mechanism is protected from the particulate material being used to fill the transit mix trucks.

It is still yet a further object of the present invention to provide an adjustable hood assembly for transit mix trucks in which the frame mechanism is easily and quickly adjusted to vary the width of the assembly in the extended open position so that the assembly can be properly used in the event of space limitations.

These and other and further objects are accomplished in one particular embodiment of this invention by pivotally mounting rear panels to the side panels at one end of the hood structure. These rear panels are then articulated into and out of a closed position about the end of a truck. An articulating frame system controls the movement of the rear and side panels so that when the rear panels are in the open position the side panels are extended outwardly and when the rear panels are in the closed position the side panels are retracted inwardly. In the fully opened position the rear panels extend outwardly from the hood assembly in the same plane as the side panels to provide complete unobstructed access through the space between the extended side panels. The articulating movement of the frame system is accomplished by a pair of pneumatic cylinders secured to the upper frame portion having piston arms connected to lever means of the frame system. The width of the assembly in the extended open position is made variable by providing the rear panel arms with short rod segments having a plurality of holes, each of which is capable of securing the end of an articulating long rod segment. This adjustment is made by means of a quick release pin that joins the two rod segments. The adjustment to the rod segments is made in combination with a corresponding adjustment to shaft collars positioned around the piston arms of the pneumatic cylinders. This combination of corresponding adjustments allows the assembly to be extended and opened at any one of a variety of overall assembly widths. The articulation lever arrangement of the frame system is such that the hood assembly provides maximum clearance for drive-through operation at all extension widths and yet retains complete enclosure of the end of the truck adjacent the filling opening so as to capture substantially all of the dust and particulate matter created by the filling operation. A dust cover for the pneumatic cylinders is also provided.

BRIEF DESCRIPTION OF THE DRAWINGS

Further objects of the invention together with additional features contributing thereto and advantages accruing therefrom will be apparent from the following description of a preferred embodiment shown in the drawings wherein.

DESCRIPTION OF A PREFERRED EMBODIMENT

Figure 1:
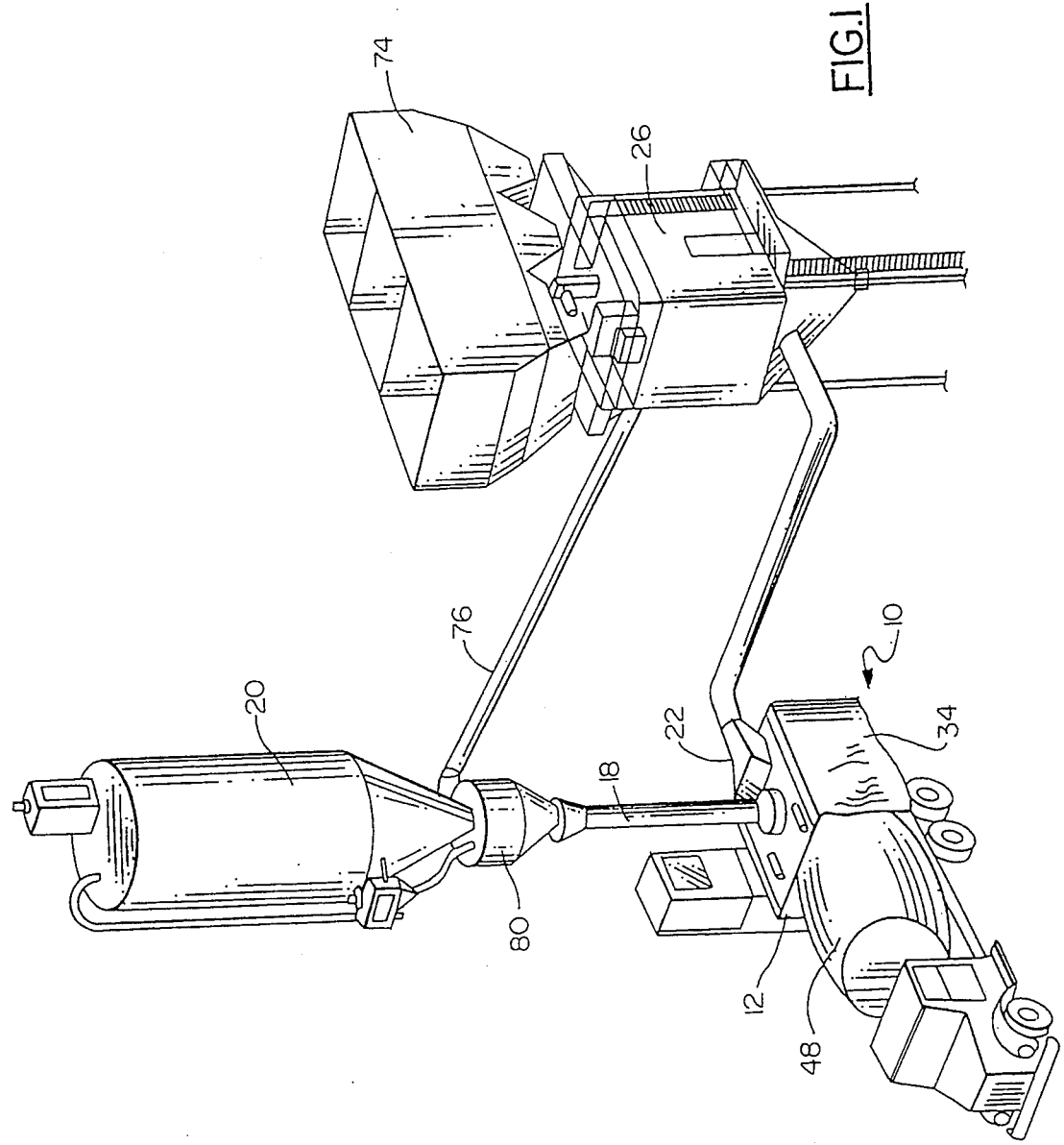
FIG. 1 is a perspective view of a batch plant equipped in accordance with the present invention.
Figure 2:
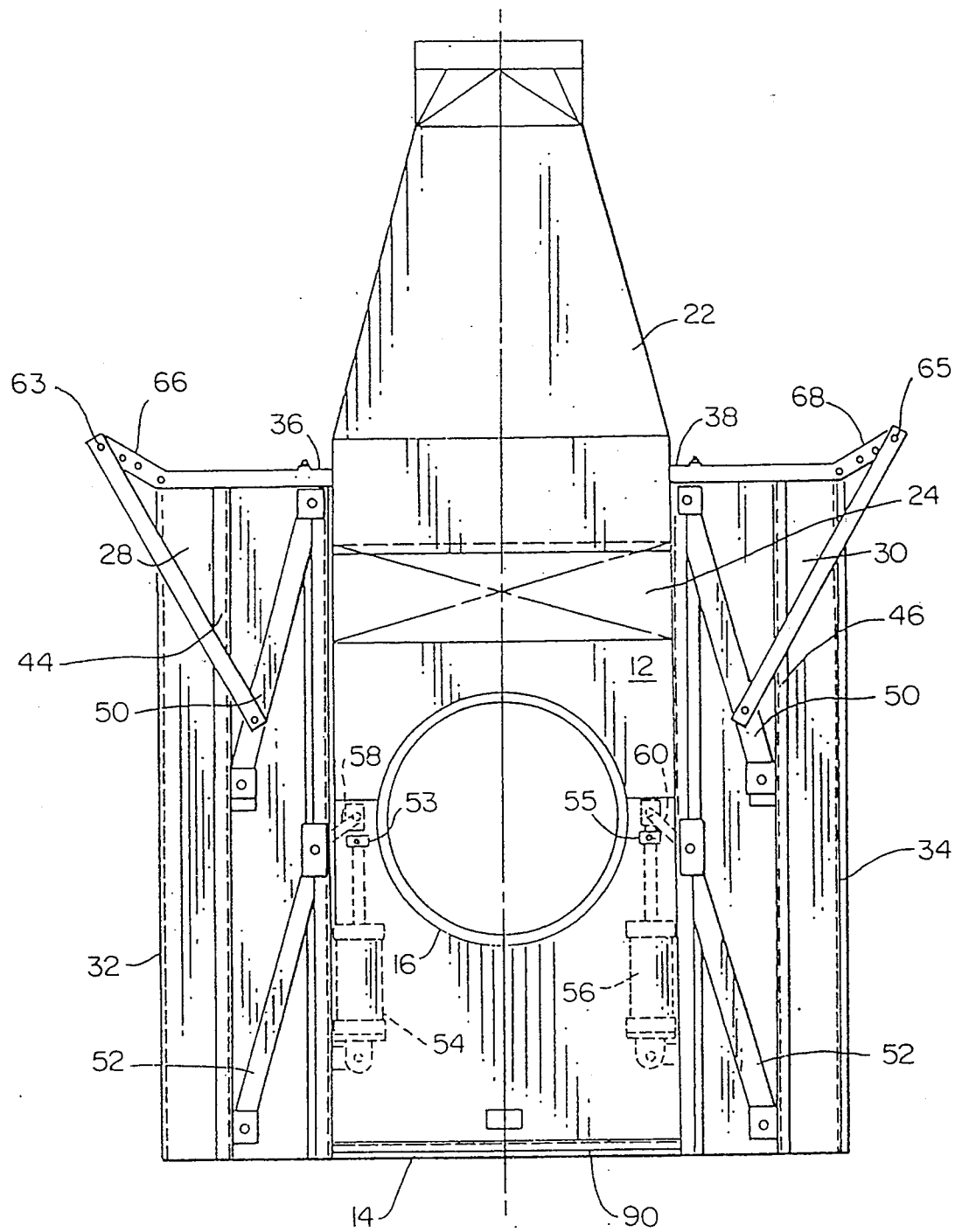
FIG. 2 is a top plan view of the adjustable hood assembly of the present invention in the fully retracted closed position.
Figure 3:
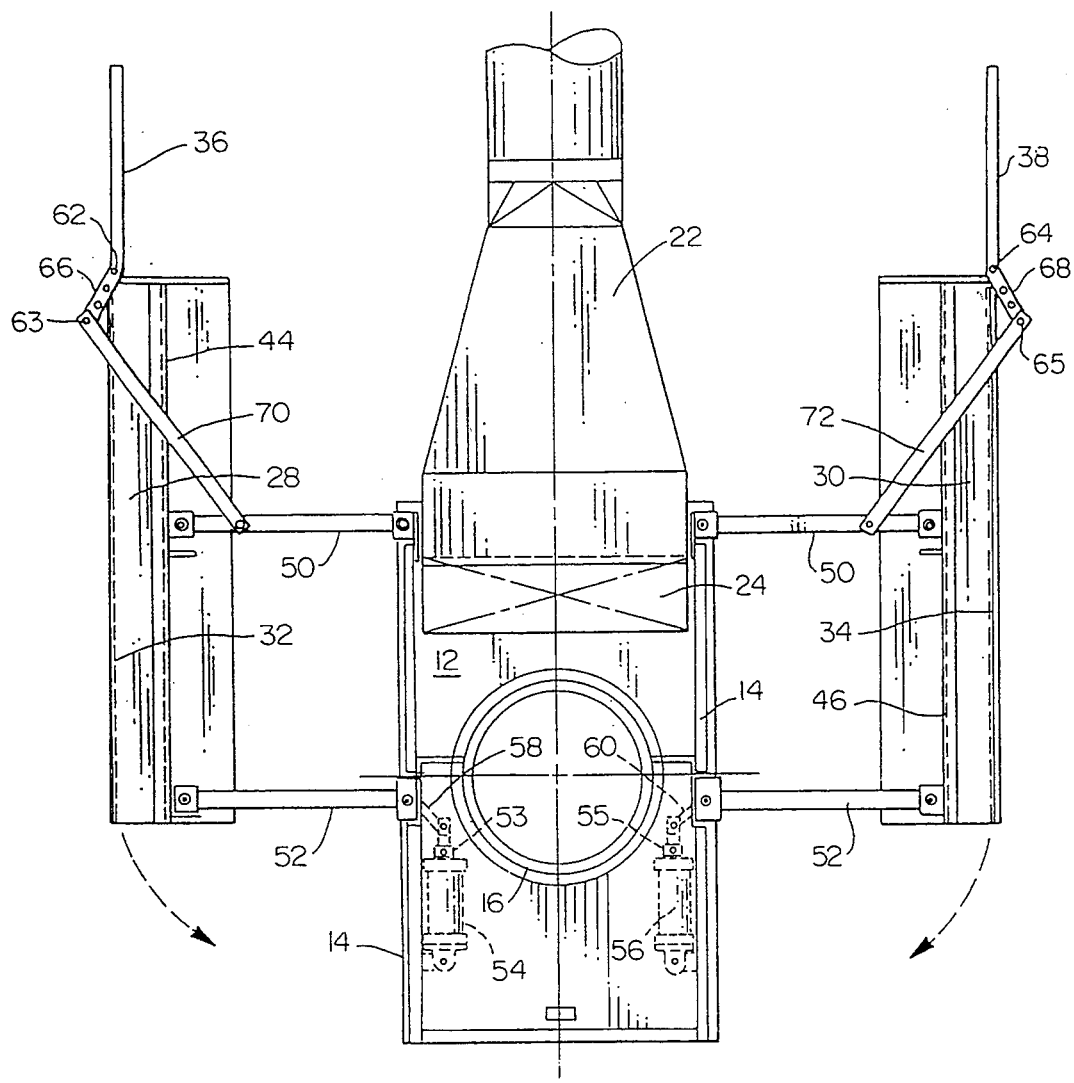
FIG. 3 is a view similar to FIG. 2 of the adjustable hood assembly of the present invention in the fully extended open position.

Referring now to FIGS. 1-3 an adjustable housing or hood assembly 10 includes a top panel member 12, mounted on a frame 14. Top panel 12 has a circular opening or entrance port 16 sized to receive a filling chute 18 therein. The filling chute 18 may extend into the truck mixer chute. Connected at the other end of the filling chute 18 is a usual cement silo 20. An exhaust duct 22 is connected at one end to an exhaust port 24 formed in top panel 12 and at the other end to a dust collector bag house 26.

Figure 4:
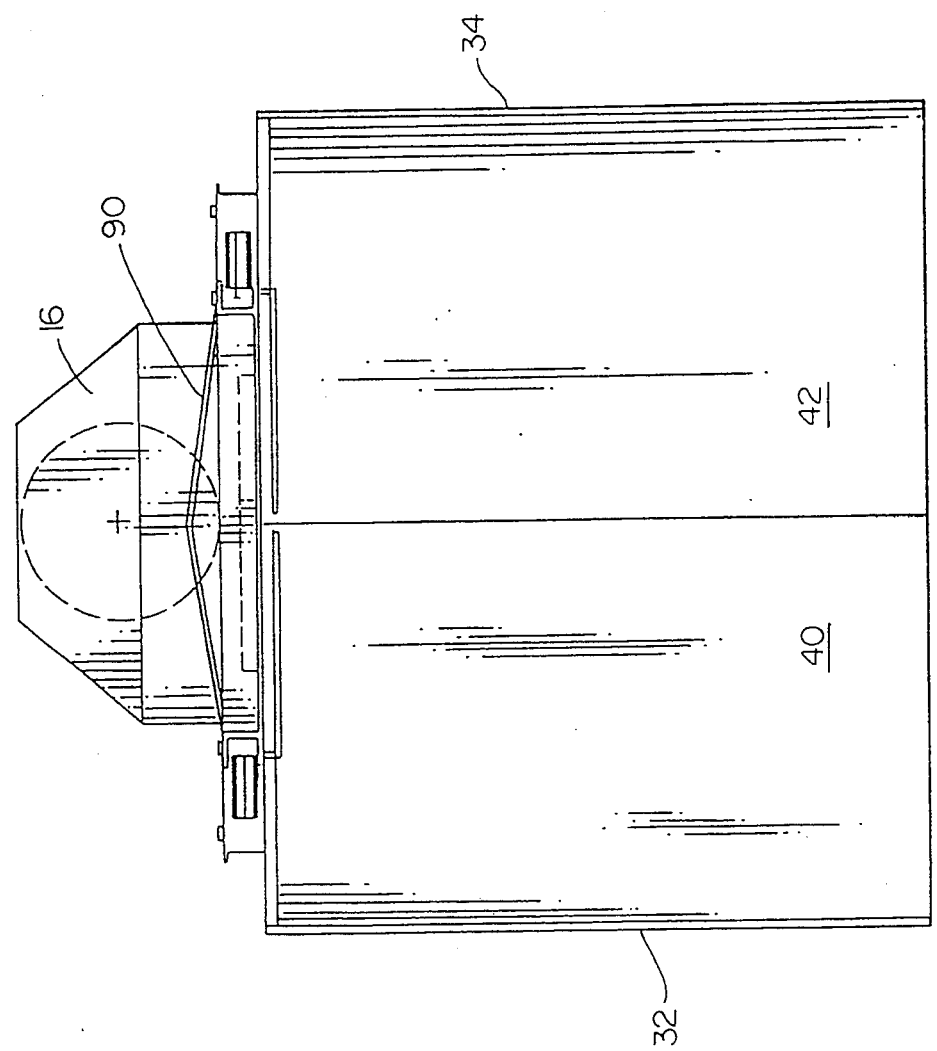
FIG. 4 is a front view of the adjustable hood assembly of the present invention in the fully retracted closed position.

Also connected to the top panel 12 and frame 14 along the sides thereof are a pair of opposed top panel extensions 28 and 30 which in turn carry side panels 32 and 34. Side panels 32 and 34 are flexible and hang down from top panel extensions 28 and 30 about the sides of a truck parked thereunder. The flexible material forming side panels 32 and 34 extends around one end of frame 14 and is supported by articulating rear arms 36 and 38 to enclose the back of a truck positioned underneath hood assembly 10. As shown in FIG. 4, the material forming side panels 32 and 34 carried onto rear arms 36 and 38 also forms a pair of "back doors" or rear panels 40 and 42 for enclosing the end of hood assembly 10 when in the closed position. Side panels 32 and 34 are made from a flexible sheet material such as Neoprene, rubber, canvas or the like that is generally air and dust tight and yet flexible enough to conform about the sides of the usually odd shaped transit mix trucks. The flexible side and back panels are particularly advantageous in that they conform to the semi-cylindrical shapes of the mixer drums and also wrap around the various structural members of the truck so as minimize leakage of air into and through adjustable hood assembly 10. Dust collection through exhaust duct 22 is thus maximized.

Figure 5:
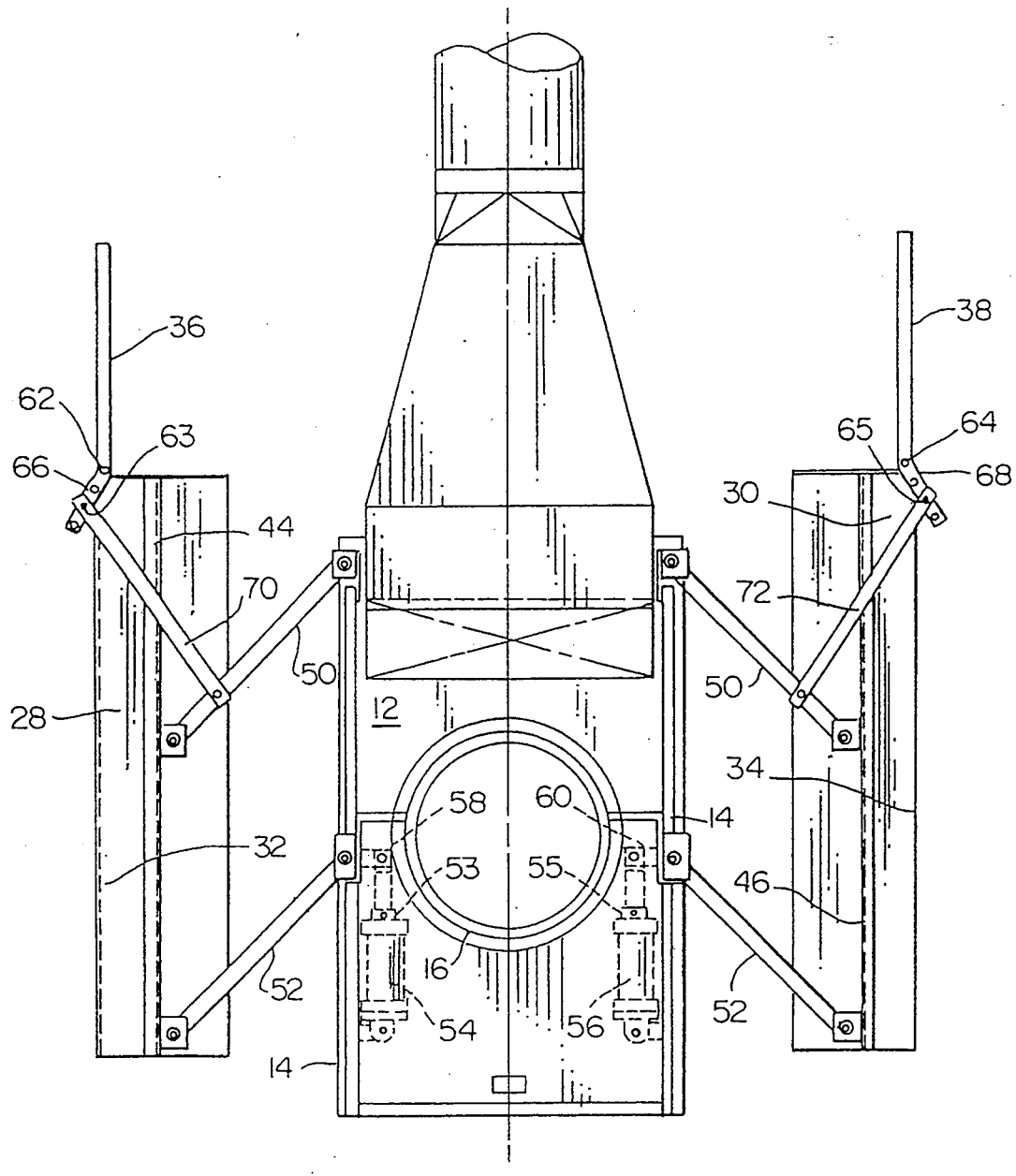
FIG. 5 is a view similar to FIG. 2, of the adjustable hood assembly of the present invention in an intermediate extended open position.

As may be seen in FIGS. 2 and 3, the top panel extensions 28 and 30 are mounted on side rails 44 and 46 and carry the flexible side panels 32 and 34 along the edge thereof. As can be seen in FIGS. 1-3, side panels 32 and 34 drape downwardly from top panel extensions 28 and 30 and extend down about the sides of the truck enclosing a mixing barrel or drum 48 of a truck parked under hood assembly 10. Side rails 44 and 46 are pivotally joined to frame 14 by two pair of extension arms, rearward extension arms 50 and forward extension arms 52. The extension arms 50 and 52 are pivotally connected at one end to the frame 14 and at the other end to side rails 44 and 46 and are arranged so that in the retracted position they are nearly parallel to the opposed sides of the frame 14. In the extended position shown in FIG. 3, the extension arms 50 and 52 are perpendicular to the opposed sides of frame 14. As shown in FIGS. 2 and 3, a pair of air cylinders 54 and 56 having piston arms are mounted to frame 14 and connected to a pair of levers 58 and 60 which are fixed at the other ends to the forward extension arms 52. The piston arms of air cylinders 54 and 56 are provided with shaft collars 53 and 55 which are secured in place by means of a set screw. As the cylinders 54 and 56 are actuated, the paired extension arms 50 and 52 can be moved between the perpendicular condition of FIG. 3 and the nearly parallel condition of FIG. 2. In this manner side panels 32 and 34 are moved between an extended and a retracted position. When shaft collars 53 and 55 are secured at the mid point of the piston arms, as shown in FIG. 5, the extension of side panels 32 and 34 is stopped as the collars 53 and 55 hit the face of air cylinders 54 and 56. In this position, paired extension arms 50 and 52 are placed at approximately 45 degrees to the opposed sides of frame 14.

As can be seen in FIGS. 3 and 4, the rear of hood assembly 10 includes rear panels 40 and 42. Articulating rear arms 36 and 38 carry an extension of the material forming side panels 32 and 34 to form "back doors" or the rear panels 40 and 42. Articulating rear arms 36 and 38 are secured by permanent hinge pins to the rearward ends of side rails 44 and 46, respectively, at points 62 and 64 so they can be opened to the position shown in FIGS. 3 and 5. Rear arms 36 and 38 are extended and slightly bent to form a pair of short rod segments 66 and 68, respectively, having a plurality of holes formed therein. Short rod segments 66 and 68 are in turn hinged to a pair of long rod segments 70 and 72 by removable hinge pins 63 and 65, respectively, which, as shown in FIGS. 2, 3 and 5, are hinged to the pair of rearward extension arms 50. As extension arms 50 and 52 move between the extended and retracted positions, long rod segments 70 and 72 move short rod segments 66 and 68 by lever action, thus causing articulating rear arms 36 and 38 to swing open and closed about hinge points 62 and 64.

As mentioned above, short rod segments 66 and 68 are provided with a plurality of holes. Long rod segments 70 and 72 can be pinned in any one of these holes by use of removable hinge pins 63 and 65. The adjustable aspect of the hood assembly of the present invention is achieved by making corresponding adjustments to shaft collars 53 and 55 and long rod segments 70 and 72 so that hood assembly 10 can be properly operated in a variety of spaces. For example, as shown in FIG. 5 shaft collars 53 and 55 are secured halfway along the piston arms of air cylinders 54 and 56. A corresponding adjustment is made in long rod segments 70 and 72 by pinning them at a point along short rod segments 66 and 68 closer to hinge points 62 and 64. In this manner, as the air cylinders are activated, the extension of the side panels 32 and 34 will stop when shaft collars 53 and 55 hit the face of the cylinders. At this point, because of a corresponding adjustment to the placement of long rod segments 70 and 72, the rear panels 40 and 42 will be fully opened.

As would be evident to an operator of the system, corresponding adjustments to long rod segments 70 and 72 and shaft collars 53 and 55 need not necessarily be made in tandum. For example, an adjustment could be made to long rod segment 70 and shaft collar 53 to limit the extention of side panel 32 while leaving long rod segment 72 and shaft collar 55 in a pre-existing position. In this manner, side panels 32 and 34 can be extended to different degrees independently of each other while both rear panels 40 and 42 are fully opened.

It can thus be seen that as the side panels 32 and 34 are extended by actuating air cylinders 54 and 56, the rear panels 40 and 42 will be opened to form continuations of the side panels 32 and 34, respectively. Thus, as shown in FIGS. 3 and 5, unobstructed straight through access is provided for a mixer truck to be filled and the overall width of the hood assembly in the extended open position may be varied, as described above, to accommodate a variety of space limitations. In the closed position, shown in FIGS. 2 and 4, rear panels 40 and 42 completely enclose the end of a truck parked underneath top panel 12 to effectively seal off the hood assembly enclosure.

As may be seen in FIGS. 1-3, the exhaust duct 22 is connected to exhaust port 24 in top panel 12 and at the other end to the bag house 26 as previously described. This permits the exhausting of air from within the enclosure formed by the side panels 32 and 34, the top panel 12, top panel extensions 28 and 30, and rear panels 40 and 42. The filling chute 18 positioned in entrance port 16 formed in top panel 12 can be readily aligned with the opening in the cement mixer drum for the filling of cement and other particulate material as is customary in the industry.

Referring again to FIG. 1, an aggregate bin 74 is provided for different types of aggregate which feeds via a belt conveyer 76 to a batcher 80. Batcher 80 also receives cement from the silo 20 and feeds the mixture to the mixer drum on the transmit mix truck through the filling chute 18. Since this material is essentially dry, it will be appreciated that a considerable amount of dust and small fines of particulate matter will be generated by the filling action which if not captured and filtered out would be released into the surrounding environment.

Referring now to FIGS. 2 and 4, there is shown a dust cover 90 positioned over top panel 12. Cover 90 has a "pitched roof" configuration to deflect material falling thereon so that any material that does escape from the filling chute 18 will not interfere with proper operation of air cylinders 54 and 56 and levers 58 and 60. By fitting dust cover 90 to top panel 12 from the exhaust duct 22 to adjacent rear panels 40 and 42 and providing a hole corresponding to entrance port 16 in top panel 12 the entire top of hood assembly 10 is protected from any excess material overflowing out of filling chute 18.

In operation the adjustable hood assembly 10 is extended and opened to the positions shown in FIGS. 3 and 5 to provide unobstructed drive-through access from either end. A truck to be filled is driven through adjustable hood assembly 10 until the mouth of the mixer drum is positioned beneath entrance port 16 and filling chute 18. The hood assembly 10 is then retracted and closed to the position of FIG. 2 by actuating cylinders 54 and 56. This substantially encloses the area where dust or airborne particulate matter is generated.

The adjustable hood assembly thus disclosed can accommodate from either end a variety of makes and models of transit mix trucks including rear and front filling trucks. After the hood is retracted and closed and the exhaust system turned on, filling operations can commence and the adjustable hood assembly shown will exhaust substantially all of the dust particles, particulate material fines and the like created by the filling process. Although the apparatus disclosed has been shown to accommodate transit mix trucks, it can be adapted readily to the filling of any large container, whether moved by a vehicle or by other means.

While this invention has been explained with reference to the structure disclosed herein, it is not confined to the details set forth and this application is intended to cover any modifications and changes as may come within the scope of the following claims:

What is claimed is:

1. An adjustable hood assembly for containing and collecting airborne particulate matter produced by filling a container with material which comprises:
    frame means for supporting a top portion, opposed side portions, and a rear portion, said portions forming a housing for a container, said housing having an entrance port and an exit port formed therein;
    drive means for moving said opposed side portions away from and toward each other between a fully extended position and a fully retracted position while dependently moving said rear portion into an open position when said opposed side portions are extended and a closed position when said opposed side portions are retracted so that a container can be positioned within said housing and enclosed therein with said opposed side portions in contact with a container to be filled;
    feed means for delivering material through said entrance port into a container enclosed by said housing; and
    exhaust means for removing from said housing, through said exit port, airborne particulate matter produced by the delivery of material into a container enclosed within said housing.

2. The adjustable hood assembly according to claim 1 wherein said frame means is supported above ground level by said feed means at a height sufficient to allow a container to be placed within said housing means when said housing means is in the extended open position.

3. The adjustable hood assembly according to claim 2 wherein said top portion, said opposed side portions and said rear portion include flexible panels, the side and rear panels being capable of moving into conforming contact against the surface of a container positioned within said housing when said housing is in the fully retracted closed position.

4. The adjustable hood assembly according to claim 3 wherein said frame means includes:
    a generally rectangular-shaped member having opposed sides longer than opposed ends for supporting said top panel;
    a plurality of paired, and oppositely opposed, extension arms, the plurality of paired arms including a rearward pair, each arm having a distal end and a proximal end being pivotally secured to one of the opposed sides of said rectangular member at a predetermined point therealong;
    a pair of side rails each being substantially parallel to a proximate opposed side of said rectangular member and pivotally mounted to the distal ends of the extension arms on the proximate opposed side of said rectangular member so that as said housing means is moved into the fully extended open position, said side rails remain substantially parallel to the opposed sides of said rectangular member and said side rails, each having one of said opposed side panels depending downwardly therefrom, move apart from each other;

a pair of articulating rear arms each pivotally linked to a proximate arm of said rearward pair of extension arms and a proximate rearward end of one of said side rails, the rear arms for supporting said rear panels so that when said plurality of extension arms are in the fully extended position, said articulating rear arms and panels are in said open position; and lever means connected to at least one pair of said plurality of paired extension arms for moving said plurality of paired extension arms between said fully extended position and said fully retracted position.

5. The adjustable hood assembly according to claim 4 wherein said drive means includes a pair of air cylinders rigidly mounted to said frame means, each of said cylinders having a piston arm operatively connected to said lever means whereby when said piston arms are pneumatically moved into the cylinders, said housing means is moved into said fully extended open position and when said piston arms are pneumatically moved out of the cylinders, said housing means is moved into said fully retracted closed position.

6. The adjustable hood assembly according to claim 5 wherein each of said pair of air cylinders includes means for limiting the stroke of its piston arm and each of said pair of articulating rear arms is adjustably connected by a removable hinge pin to one end of a rod segment being in turn pivotally linked at the other end to said proximate one of said rearward pair of extension arms at a predetermined point therealong whereby when said plurality of extension arms are in any one of a plurality of extended positions, said articulating rear arms and panels are in said open position.

7. The adjustable hood assembly according to claim 5 wherein said entrance and exit ports are formed in said top panel.

8. The adjustable hood assembly according to claim 6 wherein the side and rear flexible panels include a plurality of vertical spaced apart ribs fixed therein to hold the panels in vertical alignment about a container enclosed by said housing means.

9. A method for containing and collecting airborne particulate matter produced by filling a container with material, said method comprising the steps of:

providing a housing having side and rear panels so that the container to be filled is substantially coverable by the housing;

suspending the housing on an articulating frame system including extendable opposed side rails and a pair of openable rear arms so that the side panels can be extended and the rear panels thereby dependently opened for the positioning of the container within said housing and the panels then retracted and closed, respectively, for confining within the housing any airborne particulate matter produced by the delivery of material into the container enclosed in the housing;

providing an entrance port in the housing so that material can be delivered through the housing into the container enclosed therein; and providing an exhaust port in the housing so that any airborne particulate matter produced by the delivery of material into the enclosed container can be removed from within the housing.

10. The method of claim 9 that includes the further step of filling the container with a desired material by delivery of the material through the entrance port.

11. The method of claim 10 that includes the further step of removing through the exhaust port any airborne particulate matter produced by the delivery operation.

* * * * *